United States Patent Office 3,015,201
Patented Jan. 2, 1962

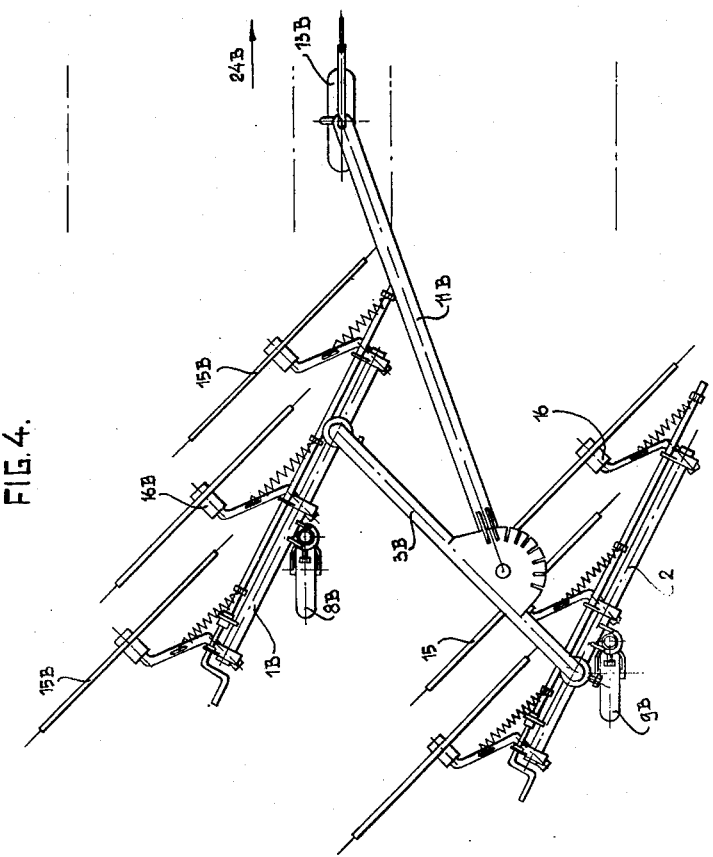

3,015,201
SIDE DELIVERY RAKE WITH REVERSIBLE
RAKE WHEELS
Cornelis van der Lely and Ary van der Lely, Maasland,
Netherlands, assignors to C. van der Lely N.V., Maasland, Netherlands, a Dutch limited company of the Netherlands
Original application Oct. 15, 1953, Ser. No. 386,298, now Patent No. 2,861,412, dated Nov. 25, 1958. Divided and this application Nov. 21, 1958, Ser. No. 775,415
Claims priority, application Netherlands Oct. 17, 1952
5 Claims. (Cl. 56—377)

This invention relates to structures and methods concerned with laterally displacing material lying on the ground, and more particularly to arrangements involving the use of a mobile frame supported by running wheels and provided with at least one raking wheel positioned obliquely with respect to the direction of travel of the frame. The invention is also particularly concerned with raking arrangements employing freely rotatable rake wheels which are rotated by contact with the ground. This application is a divisional application based on our earlier application, Serial No. 386,298, filed October 15, 1953, now Patent No. 2,861,412.

It is an object of the invention to provide improved implements which can be very simply changed from one working position to another, whereby the functions of the implements are modified or changed.

It is another object of the invention to provide improved and simplified methods for altering the operation of a raking implement.

The invention contemplates the employment of a mobile frame of the type which can assume different positions relative to a determinable direction of travel. On this type of frame raking wheels which are provided may present either of their two faces to the material which is to be displaced, this provision being made in accordance with the invention.

Raking wheels are frequently provided with tines which are inclined relative to the rotary direction of the associated wheel. Preferably, these tines are inclined in such a manner that when the tines are moving upwards according to the rotary movement of the associated wheel, material engaged by the tines can readily drop therefrom.

It is an object of the invention to provide improvements whereby the above-noted preferred inclination of tines on a raking wheel can be maintained despite the function which is to be performed by an associated raking implement and despite the positions necessarily assumed by the raking wheels to enable the performance of this function.

Generally, it will be observed that an object of the invention is to provide an improved implement and methods relating thereto whereby the implement can be used as a side delivery rake, tedder or swath turner.

Briefly, in accordance with the invention, rake wheels are supported on a frame in such a manner as to be reversible thereupon. In other words, a rake wheel has two faces or sides, one of which is conventionally directed towards the material to be processed; however, in accordance with the invention, either of the faces or sides of a rake wheel can be selectively presented to the material to be processed in order to maintain the most favorable relative positions for the associated tines for optimum operation.

Other objects and advantages of the invention will be found in the following detailed description of a preferred embodiment thereof, as illustrated in the accompanying drawing, in which:

FIG. 4 is a plan view of the device arranged for operation as a swath turner.

Figure 1:
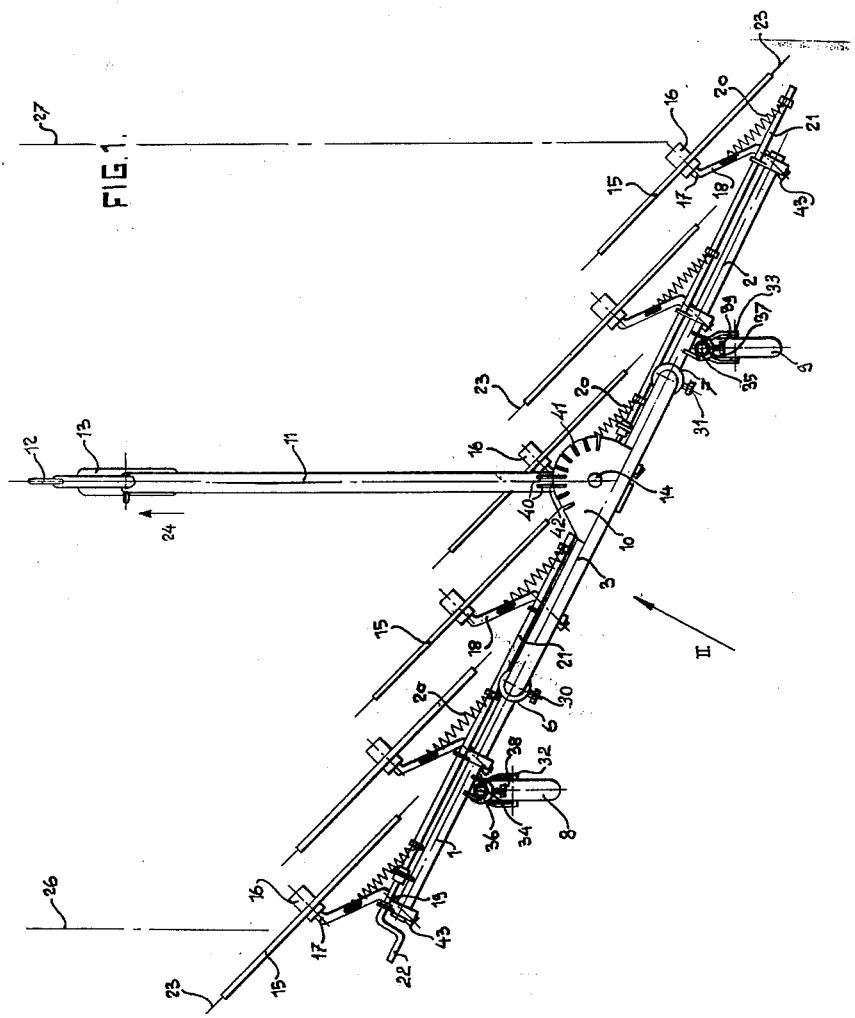
FIG. 1 is a plan view of a device embodying the invention and shown disposed for operation as a tedder ing device.

The illustrated device comprises a mobile frame which is constituted by two aligned supports or separate sections 1 and 2 connected together by means of a coupling bow or yoke 3. The vertical cylindrical lower extremities 4 and 5 of the connecting bow 3 are rotatably mounted in vertical tubular members 6 and 7 which are respectively secured to the supports 1 and 2. Rotation of the supports 1 and 2 relative to the bow 3 may be prevented by means of locking or set screws 30 and 31 extending radially into the tubular members 6 and 7 respectively for engagement with the extremities 4 and 5 of the connecting bow. During operation of the device as a teddering device (FIG. 1) and also as a side delivery rake (FIG. 3), the supports 1 and 2 are locked relative to the bow 3 in axially aligned positions.

The support 1 is supported for ground traversing movement by a running wheel 8 located therebehind, and the support 2 is correspondingly supported for ground traversing movement by a running wheel 9. The horizontal axles 32 and 33 of the running wheels 8 and 9 are rigidly connected to vertical axles 34 and 35 respectively, which are rotatable in cylindrical tubular members 36 and 37 rigidly connected to the supports 1 and 2 respectively. Locking bolts or set screws 38 and 39 extend radially into the members 36 and 37, so that the wheels 8 and 9 can be adjusted around vertical axes and can be locked in any desired position.

Conventional locking devices such as the type shown, for example in Berglund et al. Patent No. 2,522,499 of September 19, 1950, can also be employed.

To the coupling bow 3 is rigidly secured a connecting member 10 carrying a draft means or draw arm 11 which is provided at its free end with a draw hook 12 and is supported at said free end by an adjustable running wheel 13. The draw arm 11 is rotatable about a vertical axle 14 of the connecting member 10 and may be locked in position in various directions relative to the bow 3, for example, by means of metal strips 40 which are engageable in selected slots of a series of slots 41 in the member 10 and simultaneously in slots 42 in the arm 11.

On the side turned away from the supporting or running wheels 8 and 9, the supports 1 and 2 are each provided with three rake wheels 15. Each of said rake wheels is rotatably disposed with its hub 16 on the crank pin or axle 17 of a crank 18, the crank shaft 19 of which is rotatably mounted in a selected bearing 43 carried by the support 1 or 2. Each crank 18 is connected by a spring 20 to a rod 21 which is parallel to the support 1 or 2 in question and which, in order to provide for tensioning of the springs 20, is movable in longitudinal direction by the turning of an operating crank 22. The rake wheels 15 are provided with circumferential teeth 23 and, due to their weight, said rake wheels tend to turn the cranks 18, opposite to the action of the springs 20, in such direction that the rake wheels 15 lightly contact the ground with the points of their tines.

Figure 2:
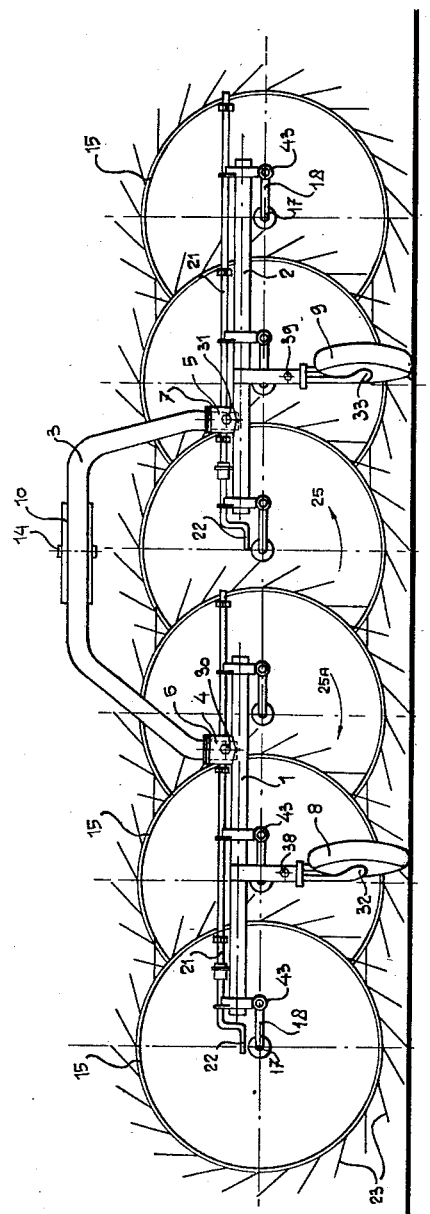
FIG. 2 is an elevational view of the device as seen in the direction indicated by arrow II in FIG. 1.

With the above described parts positioned as shown in FIG. 1, the device acts as a teddering device when it is moved in the direction of the arrow 24 by a traction force applied to the draw arm 11. Due to this movement the rake wheels 15 rotate in the direction of the arrow 25 shown in FIG. 2, by which the hay lying on the ground in front of the rake wheels is worked along a width defined by the lines 26 and 27 (FIG. 1). Along this wide area, the hay is caught and lifted by each of said rake wheels and then released. Although the rake wheels overlap each other, this overlapping arrangement is such that of each two adjacent rake wheels, considered in the line of draft or travelling direction 24, the rear part of the next foremost rake wheel is located behind the front part of the following rake wheel so that none of the rake wheels can affect the working of an adjacent rake wheel.

Figure 3:
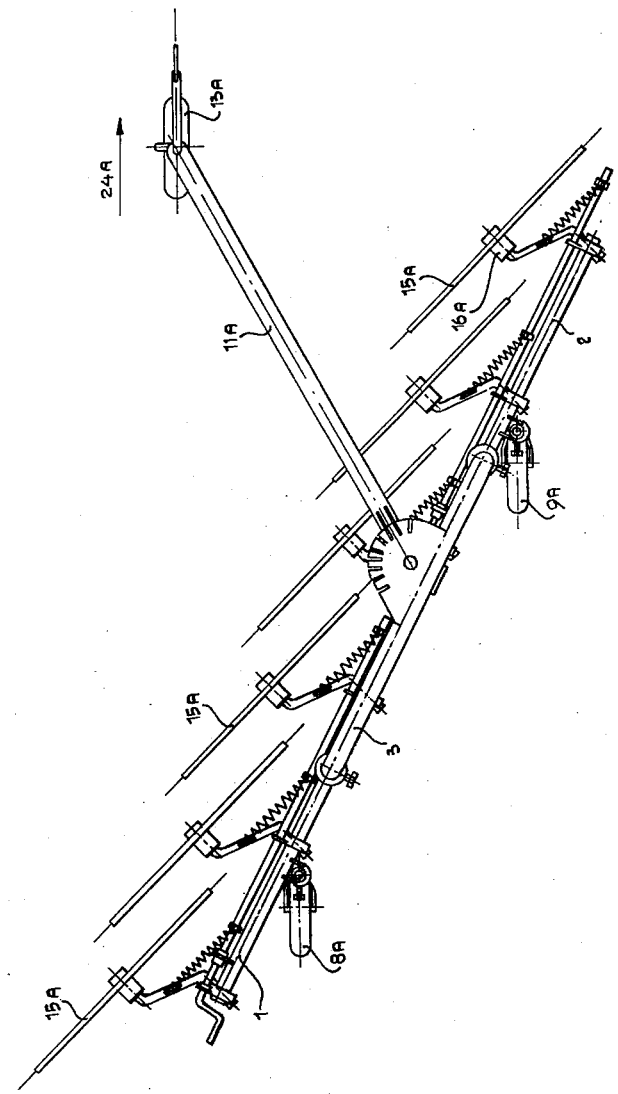
FIG. 3 is a plan view similar to FIG. 1 showing the device arranged for operation as a side delivery rake.

If the draw arm 11 is swung from the position of FIG. 1 into the position 11A shown in FIG. 3 and is locked in this position, after which the device is moved in the direction of the arrow 24A, the running wheels being adjusted respectively to the positions 13A, 9A and 8A, the device may be used as a normal side delivery rake, provided that the rake wheels 15 are first removed with their hubs from the crank pins 17, then reversed and secured in the reversed position on the crank pins, as indicated at 15A in FIG. 3. This reversal of the rake wheels is necessary, if the teeth 23, as is the case in smaller rake wheels and as has been indicated, are rearwardly inclined in the direction of rotation of the wheel. Upon movement of the device in the direction 24A, the rake wheels will rotate in opposite direction and consequently the inclined position of the teeth 23 should be adapted to the new direction of rotation by the reversal of the rake wheels. It will be readily understood that upon movement of the device in the direction of the arrow 24A, the overlapping arrangement of the rake wheels will be such as is required for a good raking action, i.e. considered in the travelling direction 24A the front part of the trailing rake wheel of each two consecutive rake wheels will be overlapped by the rear part of the preceding one of said rake wheels. Thus the overlapping rake wheels will cooperate with each other in such a manner that each preceding rake wheel will put the material delivered sideways within the reach of the following rake wheel.

Finally the device may serve as a swath turner as well. The coupling bow 3 is then swung with respect to the support 2 into the position 3B shown in FIG. 4, while the support 1 is swung relative to the bow to the position 1B and the rake wheels connected to said support will take the positions indicated at 15B, the draw arm being put into the position 11B and the rake wheels being mounted on the hubs at 16B. By the rake wheels 15B of the support 1B on the one hand and by the rake wheels 15 of the support 2 on the other hand, a separate swath will then be turned.

When used as a teddering device (in the direction of arrow 24) and when used as a side delivery rake (direction of traction 24A), the running wheels 8 and 9, respectively, of the device may be self-adjusting or swivel wheels.

By means of the operating crank 22 which, when manipulated, varies the tension in springs 20, the cranks 18 of the rake wheels may be turned in their bearings so as to adjust the pressure of the rake wheels 15 on the ground and, if desired, to lift said rake wheels entirely from the ground.

In the illustrated teddering device the rake wheels are arranged in a single row. It will be understood that said wheels may be arranged as well in two or more rows disposed in echelon with regard to each other.

As indicated above, an important feature of the invention is that the rake wheels are adapted to be reversed upon the axles by which they are supported. This enables the tines on the rake wheels to maintain a fixed attitude relative to the rotary directions of the rake wheels in which they are incorporated. Thus, in one working position of the implement described above, each rake wheel will assume one oblique position relative to the direction of travel of the associated implement. This, in turn, will cause the raking wheel, as is well known to those skilled in the art, to have a determinable direction of rotation. In accordance with the invention, each rake wheel will have one of its sides facing the material to be processed, in such a manner that the tines will incline or slope oppositely to the direction of rotation. For a second working position of the implement, however, if the rake wheels are maintained in fixed positions on their axles, the tines will undesirably incline in the direction of rotation of the rake wheels. Consequently, the provisions of the invention enable the rake wheels to be reversed so that their sides or faces are interchanged, whereupon the tines will once again properly incline opposite to the direction of rotation of the associated rake wheels.

Stated generally, the invention therefore provides, in accordance with one of its principal features, a frame upon which rake wheels are detachably supported so that either face of each rake wheel may be selectively directed towards or away from the frame, or towards or away from the material which is to be encountered. This provision is embodied both in structure and in a method, as has been indicated above.

There will now be obvious to those skilled in the art many modifications and variations of the structures and methods set forth above. These modifications and variations will not, however, depart from the spirit of the invention as defined in the following claims.

What is claimed is:

1. A side delivery rake having a line of draft and comprising a mobile frame, draft means pivotally and operatively associated with said frame and extending therefrom generally in the line of draft, at least one supporting wheel operatively associated with said frame for rotation in a plane substantially parallel to the line of draft, and at least two raking wheels operatively associated with said frame in overlapping relation, one of the raking wheels being generally ahead of the other and the other of said raking wheels including a leading portion in back of a portion of said one raking wheel for a side delivery operation, the raking wheels being detachably mounted on said frame whereby said raking wheels can be reversed for a tedding operation.

2. A side delivery rake comprising a frame and at least two raking wheels operatively associated with said frame in overlapping relation, one of said raking wheels being generally ahead of the other and the other of said raking wheels including a leading portion in back of a portion of said one raking wheel for a side delivery operation, the raking wheels being detachably mounted on said frame whereby said raking wheels can be reversed for a tedding operation.

3. A side delivery rake as claimed in claim 2 wherein each raking wheel includes tines, including outer extremities inclining backwards with respect to the direction of location of the associated raking wheel.

4. A side delivery rake as claimed in claim 2, wherein said raking wheels are freely rotatable.

5. A side delivery rake as claimed in claim 2, wherein each raking wheel has opposite faces, one of which faces said frame for the side delivery operation, and the other of which faces said frame for the tedding operation.

References Cited in the file of this patent

UNITED STATES PATENTS

| | | |
|---|---|---|
| 2,680,343 | Enos | June 8, 1954 |
| 2,712,723 | Ryan | July 12, 1955 |
| 2,861,412 | Van der Lely | Nov. 25, 1958 |

FOREIGN PATENTS

| | | |
|---|---|---|
| 986,330 | France | Mar. 21, 1951 |